US007705983B2

(12) United States Patent
Imura et al.

(10) Patent No.: US 7,705,983 B2
(45) Date of Patent: Apr. 27, 2010

(54) WAVELENGTH DISPLACEMENT CORRECTING SYSTEM

(75) Inventors: Kenji Imura, Toyohashi (JP); Takeshi Matsumoto, Toyonaka (JP)

(73) Assignee: Konica Minolta Sensing, Inc., Sakai-shi (JP)

( * ) Notice: Subject to any disclaimer, the term of this patent is extended or adjusted under 35 U.S.C. 154(b) by 193 days.

(21) Appl. No.: 12/020,797

(22) Filed: Jan. 28, 2008

(65) Prior Publication Data

US 2008/0212092 A1  Sep. 4, 2008

(30) Foreign Application Priority Data

Jan. 31, 2007  (JP) .............................. 2007-021956

(51) Int. Cl.
*G01J 3/28* (2006.01)

(52) U.S. Cl. ...................................... 356/328

(58) Field of Classification Search ........................ None
See application file for complete search history.

(56) References Cited

U.S. PATENT DOCUMENTS 5,880,832 A * 3/1999 Eastman et al. ............. 356/326
6,606,156 B1   8/2003 Ehbets et al. ............... 356/328
7,116,417 B2 * 10/2006 Imura ........................ 356/326

FOREIGN PATENT DOCUMENTS

JP      2000-298066 A    10/2000
JP       2005-69784 A     3/2005

* cited by examiner

*Primary Examiner*—Tu T Nguyen
(74) *Attorney, Agent, or Firm*—Sidley Austin LLP

(57) ABSTRACT

A wavelength displacement correcting system and method where a monochromatic beam from an LED is incident through an incident slit of a spectral device and is diffracted on a diffraction grating to form a dispersed light image. Information relating to the dispersed light image is outputted and a wavelength displacement is calculated, using a forward voltage value corresponding to the constant current, and a forward voltage initial value. Wavelength displacement amounts of at least two diffracted beams are calculated, using output values of the at least two diffracted beams, and diffracted beam output initial values with respect to the dispersed light image. A dispersion width is calculated, using the calculated wavelength displacement amount of the beam, and the calculated wavelength displacement amounts of at least two diffracted beams.

7 Claims, 5 Drawing Sheets

WAVELENGTH DISPLACEMENT CORRECTING SYSTEM

This application is based on Japanese Patent Application No. 2007-21956 filed on Jan. 31, 2007, the contents of which are hereby incorporated by reference.

BACKGROUND OF THE INVENTION

1. Field of the Invention

The present invention relates to a wavelength displacement correcting system for use in a polychromator, particularly for use in a polychromator provided with plastic molded parts to correct a wavelength displacement of the polychromator with time and/or under heat.

2. Description of the Related Art

Conventionally, there has been popularly used a polychromator, as a spectral device for use in a spectral apparatus such as a spectrocolorimeter or a spectroradiometer. The polychromator is constructed in such a manner that wavelength dispersed beams by diffraction on a diffraction grating are simultaneously received on a light receiving array. Considering production cost reduction, it is desirable to use plastic molded parts as primary elements of the polychromator such as a diffraction grating or a housing. The plastic molded parts, however, unavoidably undergo a change with time and/or under heat after the molding, with the result that a wavelength displacement is unavoidable. There are two kinds of wavelength displacement. One is a displacement or change in dispersion width, primarily resulting from a change in grating constant by thermal expansion of a diffraction grating. The other is a uniform displacement or change primarily resulting from a positional displacement in optical arrangement. The former is a displacement proportional to wavelength, and the latter is a displacement which is not proportional to wavelength. There are known technologies to correct these displacements, for instance, the first conventional art disclosed in Japanese Unexamined Patent Publication No. 2005-69784 (D1) i.e. counterpart U.S. Pat. No. 7,116,417B2, and the second conventional art disclosed in Japanese Unexamined Patent Publication No. 2000-298066 (D2) i.e. counterpart U.S. Pat. No. 6,606,156B1.

D1 discloses use of a monochromatic beam from an LED (light emitting diode) of a low cost and yet with an unstable wavelength output, as a reference beam by measuring the wavelengths of a first-order diffracted beam as a first-order beam, and a second-order diffracted beam as a second-order beam. Specifically, D1 utilizes a phenomenon that a positional displacement in optical arrangement causes an identical wavelength displacement with respect to the first-order beam and the second-order beam, whereas a wavelength displacement of the light emitting diode causes a wavelength displacement with respect to the second-order beam twice as large as a wavelength displacement with respect to the first-order beam. With use of the phenomenon, the wavelength displacement resulting from a positional displacement in optical arrangement is detected and corrected by eliminating the wavelength displacement of the light emitting diode. In D1, however, it is impossible to distinguish a wavelength displacement of the light emitting diode from a change in dispersion width, because in both of the cases, the wavelength displacement with respect to the second-order beam is twice as large as the wavelength displacement with respect to the first-order beam. Accordingly, D1 fails to correct a change in dispersion width resulting from a change in grating constant, which may be serious in the case where a plastic diffraction grating subjected to a large thermal expansion is used.

In D2, a plastic material is used for a diffraction grating and a housing. By using the plastic material for the diffraction grating and the housing, a decrease in dispersion width resulting from a change in grating constant by thermal expansion is cancelled by an increase in dispersion width by thermal expansion of the housing, and a uniform wavelength change resulting from a positional displacement in optical arrangement by thermal expansion is cancelled by a thermal expansion of a support member of a light receiving array made of a material different from the material of the housing. D2, however, is proposed on a premise that the entirety of the polychromator is uniformly subjected to a temperature change. Accordingly, D2 not only fails to cope with a non-uniform temperature change but also fails to cope with a wavelength displacement resulting from a cause other than the temperature change such as a change with time.

SUMMARY OF THE INVENTION

In view of the above problems residing in the conventional art, it is an object of the present invention to provide a wavelength displacement correcting system that enables to correct both a dispersion width change and a uniform wavelength change, resulting from a change of a polychromator with time and/or under heat.

A wavelength displacement correcting system according to an aspect of the invention is configured in such a manner that a monochromatic beam from a light emitting diode driven by a constant current is incident through an incident slit of a spectral device. The incident beam is diffracted on a diffraction grating to form a dispersed light image of the incident slit, and information relating to the dispersed light image is outputted from the spectral device. A wavelength displacement amount of the monochromatic beam is calculated by using a forward voltage value corresponding to the constant current, and a forward voltage initial value. Wavelength displacement amounts of at least two diffracted beams are calculated by using at least two diffracted beam output values, and diffracted beam output initial values with respect to the dispersed light image. A dispersion width displacement amount of the spectral device is calculated by using the calculated wavelength displacement amount of the monochromatic beam, and the calculated wavelength displacement amounts of at least two diffracted beams, whereby a wavelength displacement of the spectral device is corrected.

In the above arrangement, the dispersion width change of the optical components of the spectral device, and/or the dispersion width change resulting from a relative positional displacement of the optical components is corrected, and the wavelength precision at the time of initial wavelength calibration is substantially maintained. In particular, the aspect of the invention is suitably applied to a polychromator, wherein a plastic molded part is used as a diffraction grating and/or a housing.

These and other objects, features and advantages of the present invention will become more apparent upon reading the following detailed description along with the accompanying drawings.

DETAILED DESCRIPTION OF THE PREFERRED EMBODIMENTS

Figure 1:
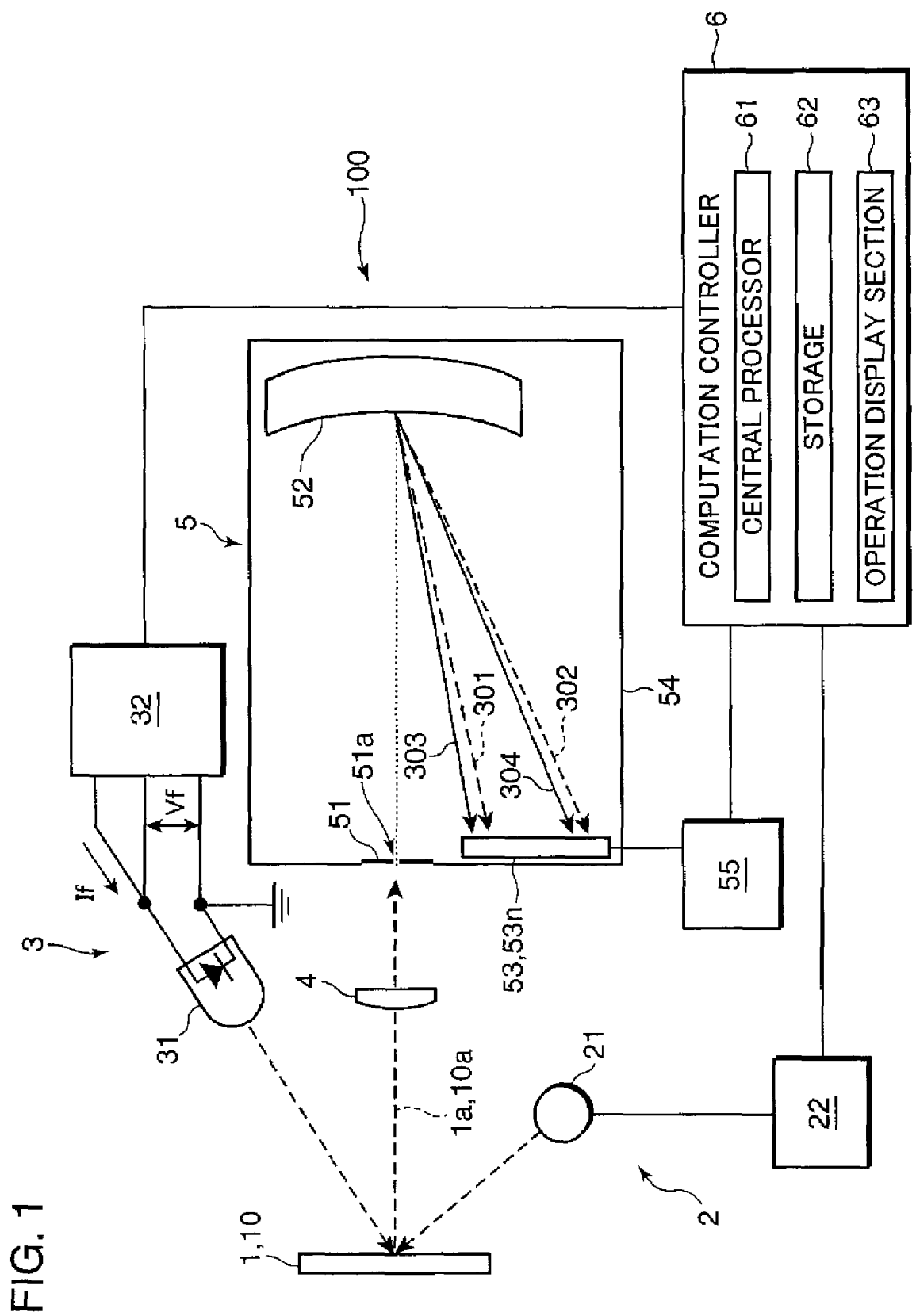
FIG. 1 is a block diagram showing an example of a wavelength displacement correcting system embodying the invention.

In the following, an embodiment of the invention is described referring to the drawings. The elements with the same reference numerals throughout the drawings have the same arrangement, and repeated description thereof is omitted herein.

(Overall Description on Wavelength Displacement Correcting System)

FIG. 1 is a block diagram showing an example of a wavelength displacement correcting system embodying the invention. Referring to FIG. 1, a wavelength displacement correcting system 100 includes a measurement illuminator 2, a correction illuminator 3, a measurement optics 4, a polychromator 5, and a computation controller 6.

The measurement illuminator 2 includes an incandescent lamp 21 as a light source, and a lamp controller 22 for controlling on/off operations of the incandescent lamp 21. The measurement illuminator 2 is adapted to illuminate a sample 1 or a white reference sample 10 by the incandescent lamp 21. In this embodiment, the measurement illuminator 2 employs a so-called 45/0 geometry constructed in such a manner that the sample 1 or the white reference sample 10 is illuminated from a direction inclined by about 45° i.e. 45-degree inclined direction with respect to the normal to the sample surface.

The correction illuminator 3 includes e.g. an ultraviolet light emitting diode 31 as a light source, and an LED controller 32 for controlling on/off operations of the ultraviolet light emitting diode 31. The correction illuminator 3 is adapted to illuminate the sample 1 or the white reference sample 10 by the ultraviolet light emitting diode 31. The LED controller 32 includes e.g. a constant current source (not shown) for driving the ultraviolet light emitting diode 31 with a constant current I f, and a forward voltage measuring circuit (not shown) for measuring a forward voltage Vf of the ultraviolet light emitting diode 31 during driving of the ultraviolet light emitting diode 31. The LED controller 32 converts the forward voltage measurement value Vf measured by the forward voltage measuring circuit into a digital signal, and outputs the forward voltage measurement value Vf as the digital signal to the computation controller 6. The ultraviolet light emitting diode 31 as a light source, and the LED controller 32 including the forward voltage measuring circuit for measuring the forward voltage Vf of the ultraviolet light emitting diode 31 may be integrally fixed in the spectral device.

The measurement optics 4 is an optical system for guiding a reflection beam 1a or 10a in normal direction, which has been reflected on the sample 1 illuminated by the measurement illuminator 2, or reflected on the white reference sample 10 illuminated by the correction illuminator 3, to an incident slit 51 of the polychromator 5. The measurement optics 4 includes various lenses.

The polychromator 5 outputs a signal depending on a spectral distribution of light beams transmitted through an aperture 51a of the incident slit 51. The polychromator 5 includes e.g. a concave diffraction grating 52, a light receiving array 53, a housing 54 formed with the incident slit 51 and adapted to house the concave diffraction grating 52 and the light receiving array 53, and a signal processor 55. The concave diffraction grating 52 and/or the housing 54 may be a plastic molded part.

The reflection beam 1a or the reflection beam 10a incident through the aperture 51a of the incident slit 51 is dispersed and converged by the concave diffraction grating 52 (hereinafter, simply called as the "diffraction grating 52") at each wavelength, whereby dispersed light images of the aperture 51a are formed on the light receiving array 53. The light receiving array 53 is constituted of multiple pixels 53n to output pixel signals in accordance with an intensity of light incident onto the respective pixels 53n. The output signals from the light receiving array 53 are inputted to the signal processor 55. The signal processor 55 converts the output signals into digital pixel signals by processing the output signals from the light receiving array 53, and outputs the digital pixel signals to the computation controller 6.

The computation controller 6 controls illumination operations i.e. on/off operations of the measurement illuminator 2 and the correction illuminator 3 via the lamp controller 22 and the LED controller 32, respectively. The computation controller 6 performs various computation processing with respect to output data to be outputted from the polychromator 5.

Correcting a wavelength displacement of the polychromator 5 by a computation processing to be executed by the computation controller 6 is a primary feature of this embodiment. In the following, a principle on wavelength displacement correction is described.

In correcting a wavelength displacement in this embodiment, an output wavelength is monitored by the forward voltage of the constant-current-driven ultraviolet light emitting diode, and an emission beam from the ultraviolet light emitting diode whose output wavelength is monitored is used in the technology recited in D1. In this embodiment, a short wavelength band in the visible region from 380 nm to 780 nm i.e. the area defined by the dotted lines 301 and 302 in FIG. 1, as a measurement range of the polychromator, is extended to 360 nm. Thereby, a first-order beam $\lambda_1=375$ nm whose position is indicated by the solid line 303, and a second-order beam $\lambda_2=750$ nm whose position is indicated by the solid line 304, which are derived from an ultraviolet beam of a wavelength 375 nm from the ultraviolet light emitting diode 31, are simultaneously measurable. The technology of D1 is applied to the above arrangement.

The following three causal factors may generate displacement amounts $d\lambda_1$ and $d\lambda_2$ (see the following equations (1) and (2)) of centroid wavelengths $\lambda_1$ and $\lambda_2$ of the first-order beam and the second-order beam derived from the ultraviolet light emitting diode 31, from initial values $\lambda_{10}$ and $\lambda_{20}$.

$$d\lambda_1=\lambda_1-\lambda_{10} \qquad (1)$$

$$d\lambda_2=\lambda_2-\lambda_{20} \qquad (2)$$

(causal factor 1) A wavelength displacement ($d\lambda_L$) of the ultraviolet light emitting diode relative to an initial condition. This displacement primarily results from a temperature change of the ultraviolet light emitting diode.

(causal factor 2) A dispersion width change relative to an initial condition i.e. a dispersion width displacement rate $d\lambda_D$/nm. This displacement is represented by $d\lambda_D$ per nm wavelength. Accordingly, the displacement with respect to the entirety of the wavelength $\lambda_L$ is ($\lambda_L*d\lambda_D$). This displacement primarily results from a change in grating constant by thermal expansion of the diffraction grating.

(causal factor 3) A displacement ($d\lambda_A$) in optical arrangement relative to an initial condition. This displacement results from a positional displacement of a housing, an adhesive agent, or a like element with time and/or under heat.

Among the above causal factors, a ratio of wavelength displacement between the first-order beam and the second-order beam by the causal factors 1 and 2 is 1:2. Specifically, assuming that the wavelength displacement amount with respect to the first-order beam is 1, the wavelength displacement amount with respect to the second-order beam is 2. On the other hand, a wavelength displacement by the causal factor 3 is uniform without depending on wavelength, and a wavelength displacement $d\lambda_A$ identical to each other between the first-order beam and the second-order beam is observed.

Specifically, assuming that an emission wavelength of the ultraviolet light emitting diode is $\lambda_L$, the wavelength displacement amounts $d\lambda_1$ and $d\lambda_2$ with respect to the first-order beam and the second-order beam relative to the initial condition are expressed by the following equations (3) and (4).

$$d\lambda_1 = [d\lambda_L + (\lambda_L + d\lambda_L)^* d\lambda_D] + d\lambda_A \approx (d\lambda_L + \lambda_L^* d\lambda_D) + d\lambda_A \quad (3)$$

$$d\lambda_2 = 2[d\lambda_L + (\lambda_L + d\lambda_L)^* d\lambda_D] + d\lambda_A \approx 2^*(d\lambda_L + \lambda_L^* d\lambda_D) + d\lambda_A \quad (4)$$

where the symbol "*" represents multiplication. In each of the equations (3) and (4), since the term $(d\lambda_L * d\lambda_D)$ is a minor value obtained by multiplying significantly small values, approximation represented by the symbol "≈" is performed by neglecting i.e. nullifying the term $(d\lambda_L * d\lambda_D)$ In other words, in view of the point that the dispersion width displacement amount $d\lambda_D$ is proportional to wavelength, there are proposed two approaches: one is using the wavelength $\lambda_L$ before the displacement; and the other is using the wavelength $(\lambda_L + d\lambda_L)$ after the displacement. In this embodiment, the wavelength $\lambda_L$ before the displacement i.e. $(\lambda_L * d\lambda_D)$ is used.

Figure 2:
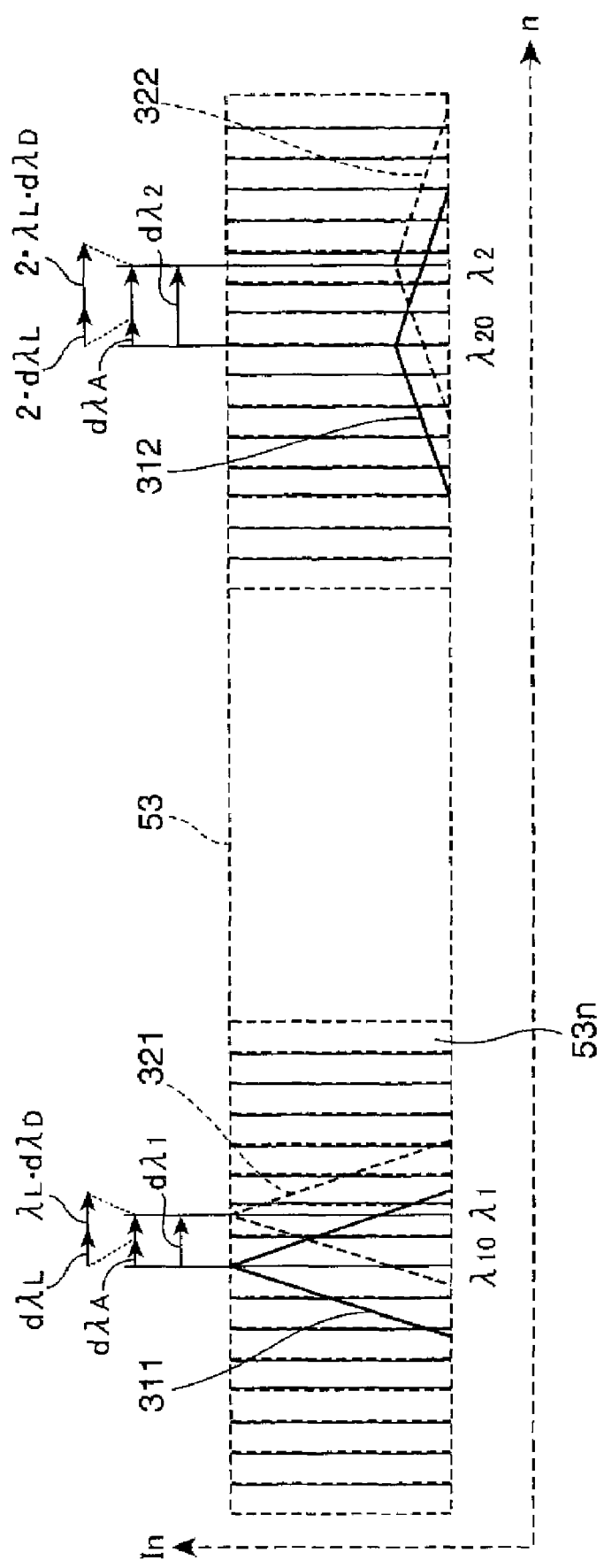
FIG. 2 is a schematic diagram for describing a principle on wavelength displacement correction.

The above operation is described concerning the wavelength displacement correcting system 100. FIG. 2 is a schematic diagram for describing a principle on wavelength displacement correction. FIG. 2 conceptually illustrates a first-order dispersed image 311 and a second-order dispersed image 312 of a monochromatic beam to be formed on the light receiving array 53 when the monochromatic beam from the ultraviolet light emitting diode 31 for emitting ultraviolet beams is incident onto the polychromator 5 before displacement; and a first-order dispersed image 321 and a second-order dispersed image 322 of the monochromatic beam to be formed on the light receiving array 53 when the monochromatic beam is incident onto the polychromator 5 after the displacement. As shown in FIG. 2, the centroid wavelengths of the first-order dispersed image 311 and 321 are displaced from each other before and after the displacement by the amount $d\lambda_1$ from the centroid wavelength $\lambda_{10}$ of the first-order dispersed image 311 to the centroid wavelength $\lambda_1$ of the first-order dispersed image 321. On the other hand, the centroid wavelengths of the second-order dispersed images 312 and 322 are displaced from each other before and after the displacement by the amount $d\lambda_2$ from the centroid wavelength $\lambda_{20}$ of the second-order dispersed image 312 to the centroid wavelength $\lambda_2$ of the second-order dispersed image 322. The displacement amount $d\lambda_1$ consists of the displacement amount $d\lambda_A$, which is common to the displacement between the first-order dispersed images 311 and 321, and the displacement between the second-order dispersed images 312 and 322; and a displacement amount $(d\lambda_L + \lambda_L^* d\lambda_D)$, which depends on wavelength i.e. proportional to the order of the beam e.g. a first-order beam, a second-order beam, .... The displacement amount $d\lambda_2$ consists of the displacement amount $d\lambda_A$, which is common to the displacement between the first-order dispersed images 311 and 321, and the displacement between the second-order dispersed images 312 and 322; and a displacement amount $(2^* d\lambda_L + 2^* \lambda_L^* d\lambda_D (= 2^* (d\lambda_L + \lambda_L^* d\lambda_D)))$, which depends on wavelength i.e. proportional to the order of the beam e.g. a first-order beam, a second-order beam, .... In other words, the displacement amounts $d\lambda_1$ and $d\lambda_2$ are expressed by: $d\lambda_1 = d\lambda_A + (d\lambda_L + \lambda_L^* d\lambda_D)$, and $d\lambda_2 = d\lambda_A + 2^*(d\lambda_L + \lambda_L^* d\lambda_D)$, as expressed by the equation (3) and (4), respectively.

Accordingly, the uniform wavelength displacement amount $d\lambda_A$ by the causal factor 3 can be derived and corrected by the following equation (5), based on the equations (3) and (4).

$$d\lambda_A = 2^* d\lambda_1 - d\lambda_2 \quad (5)$$

On the other hand, the displacement amount $d\lambda_L$ by the causal factor 1, and the displacement amount $(\lambda_L^* d\lambda_D)$ by the causal factor 2 cannot be corrected individually. Accordingly, these displacements cannot be corrected simply by obtaining a displacement amount $d\lambda_D$ by a dispersion width change.

There is a fixed relation between the temperature, and the emission wavelength $\lambda_L$ of the constant-current-driven ultraviolet light emitting diode 31. There is also a fixed relation between the temperature and the forward voltage Vf. Accordingly, there is defined a substantially linear relation as shown in e.g. FIG. 3, between the emission wavelength $\lambda_L$ (unit: nm) and the forward voltage Vf (unit: V). Under the above condition, if the relation between the emission wavelength $\lambda_L$ and the forward voltage Vf is known, it is possible to estimate the wavelength displacement amount $d\lambda_L$ of the ultraviolet light emitting diode relative to the initial condition by: measuring a forward voltage initial value Vf$_0$, as well as the centroid wavelength initial values $\lambda_{10}$ and $\lambda_{20}$ of the first-order beam and the second-order beam to be obtained at the time of performing wavelength calibration of the polychromator; and by measuring the forward voltage Vf, as well as the centroid wavelength $\lambda_1$ and $\lambda_2$ of the first-order beam and the second-order beam after the displacement to be obtained at the time of performing wavelength correction.

Figure 3:
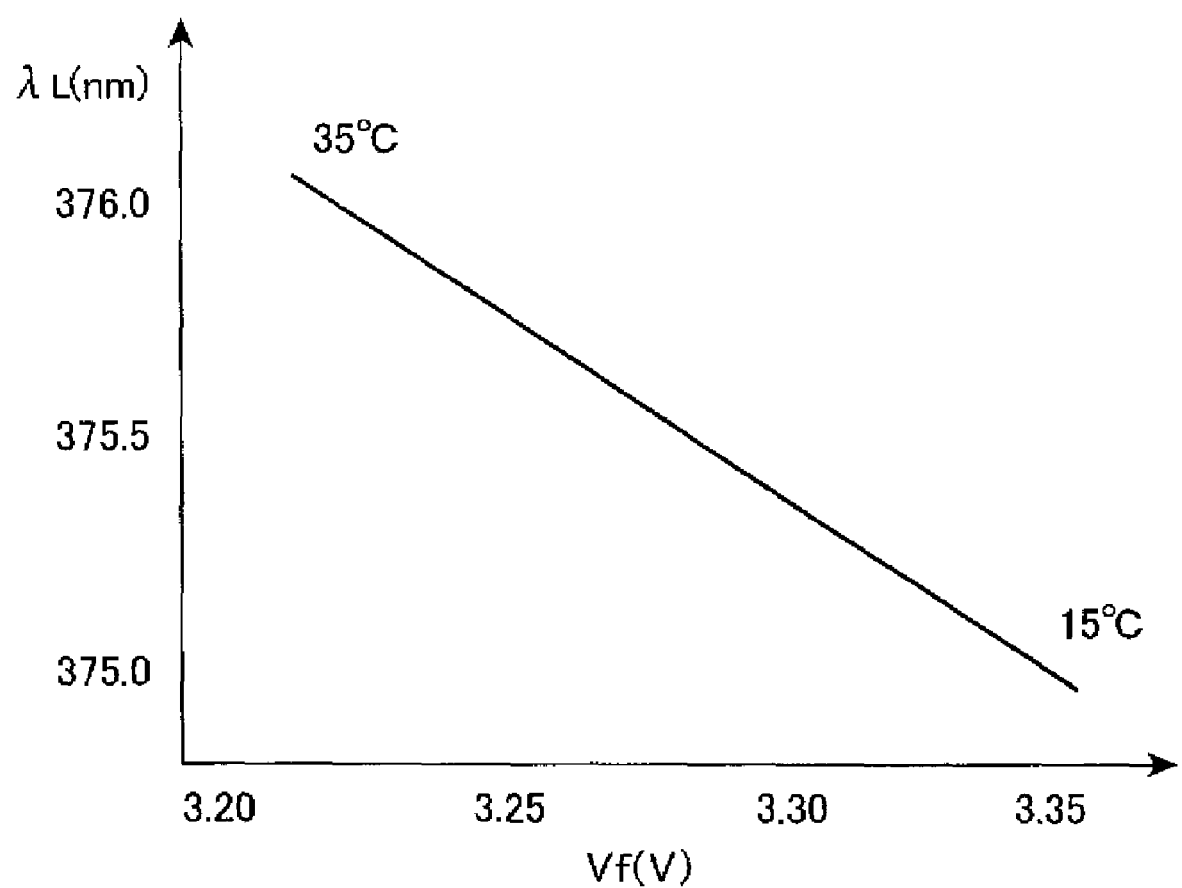
FIG. 3 is a graph showing Vf versus $\lambda_L$ characteristics of an ultraviolet light emitting diode.

For instance, if the relation between the forward voltage Vf and the emission wavelength $\lambda_L$ shown in FIG. 3 is approximated by a straight line having a gradient K, a displacement amount $d\lambda_L$ of the ultraviolet light emitting diode 31 at an emission wavelength $\lambda$ i.e. an emission wavelength displacement amount $d\lambda_L$ accompanied by a displacement amount dVf of the forward voltage i.e. the forward voltage displacement amount dVf expressed by the following equation (6) can be approximated by the following equation (7).

$$dVf = Vf - Vf_0 \quad (6)$$

$$d\lambda_L = K^* dVf \quad (7)$$

By using the emission wavelength displacement amount $d\lambda_L$ derived from the equation (7), and the aforementioned equations (3) and (4), in other words, by substituting the emission wavelength displacement amount $d\lambda_L$ in a solution obtained by subtracting the equation (3) from the equation (4), a dispersion width displacement rate $d\lambda_D$/nm relative to an initial condition, in other words, the dispersion width displacement amount $d\lambda_D$, as expressed by the following equation (8) is obtained.

$$d\lambda_D = (d\lambda_2 - d\lambda_1 - d\lambda_L)/\lambda_L \quad (8)$$

Accordingly, by using the uniform wavelength displacement amount $d\lambda_A$ and the dispersion width displacement amount $d\lambda_D$ derived from the equations (5) and (8), a displacement amount dλ at the wavelength λ, in other words, a correction amount dλ is given by the following equation (9).

$$d\lambda = \lambda * d\lambda_D + d\lambda_A \quad (9)$$

A typical value may be applied to the gradient K. A displacement of the emission wavelength λ of the ultraviolet light emitting diode 31 resulting from a temperature change is, as shown in FIG. 3, about 0.5 nm by 10° C. Accordingly, even if a displacement from the typical value of the gradient K is as large as e.g. about 20%, an error to be corrected to cancel the displacement is sufficiently as small as 0.1 nm.

Referring back to FIG. 1, the computation controller 6 includes a central processor 61, a storage 62, and an operation display section 63.

The central processor 61 includes e.g. a CPU (central processing unit) and peripheral circuits thereof, and performs various computation processing by reading a processing program or the like, to be described later, from an ROM (read only memory).

The storage 62 includes e.g. an ROM or an RAM (random access memory), and stores various processing programs relating to the computation processing, and temporarily stores data concerning the computation processing. In this embodiment, the storage 62 stores a correlation chart called (n versus λn)-correlation chart having information relating to correlations between the pixel number "n" of the respective pixels 53n of the light receiving array 53, and the centroid wavelength λn of the pixel (hereinafter, called as pixel "n") having the pixel number "n", or a center wavelength kn. The correlation chart is obtained in advance by performing wavelength calibration at the time of manufacturing the polychromator or a like occasion. In the case where the centroid wavelength matches with the center wavelength, the center wavelength may be used in place of the centroid wavelength. The storage 62 also stores the initial values (hereinafter, called as "centroid wavelength initial values") $\lambda_{10}$ and $\lambda_{20}$ of the centroid wavelengths of the first-order beam and the second-order beam derived from the ultraviolet light emitting diode 31; the forward voltage initial value $Vf_0$ to be obtained at the time of acquiring the centroid wavelength initial values; and the value of the gradient K of the straight line (see FIG. 3) for approximating the relation between the forward voltage Vf of the ultraviolet light emitting diode 31, and the emission wavelength $\lambda_L$. The central processor 61 in the computation controller 6 converts the digital pixel signals into spectral information by using the (n versus λn)-correlation chart.

The operation display section 63 is functioned as an enter key by which the user is allowed to input various operation commands, and is adapted to display various information relating to computation processing.

(Description on Overall Operation Flow)

To summarize the overall operation flow, prior to measurement of the sample 1, in a correction flow, the measurement illuminator 2 is turned on to illuminate the white reference sample 10 whose spectral reflectance factor is known, and then, the computation controller 6 calculates a calibration coefficient by a well-known method, based on a spectral output i.e. a spectral distribution outputted from the polychromator 5, and stores the calculation result. Then, in a measurement flow, similarly to the correction flow, the computation controller 6 calculates a spectral reflectance factor of the sample 1 by a well-known method, based on a spectral output i.e. a spectral distribution obtained by illuminating the sample 1 by the measurement illuminator 2, and the calibration coefficient stored in the correction flow. In the following, the correction flow and the measurement flow are described.

(Correction Flow)

In this embodiment, the wavelength displacement correction is performed at the time of white calibration. The computation controller 6 turns on the ultraviolet light emitting diode 31 in the correction illuminator 3 with the constant current I f supplied from the constant current source of the LED controller 32 in a state that the measurement illuminator 2 is in an off-state to illuminate the white reference sample 10 placed in the measurement aperture of the wavelength displacement correcting system 100. Then, a wavelength shift amount dλn of the centroid wavelength λn of each pixel "n" is estimatively calculated based on the aforementioned equation (9) (see the following equation (10)).

$$d\lambda n = \lambda n * d\lambda_D + d\lambda_A \quad (10)$$

The value of λn in the (n versus λn)-correlation chart is updated to (λn+dλn) by using the wavelength shift amount dλn. Thereby, the wavelength displacement correction is ended.

Figure 4:
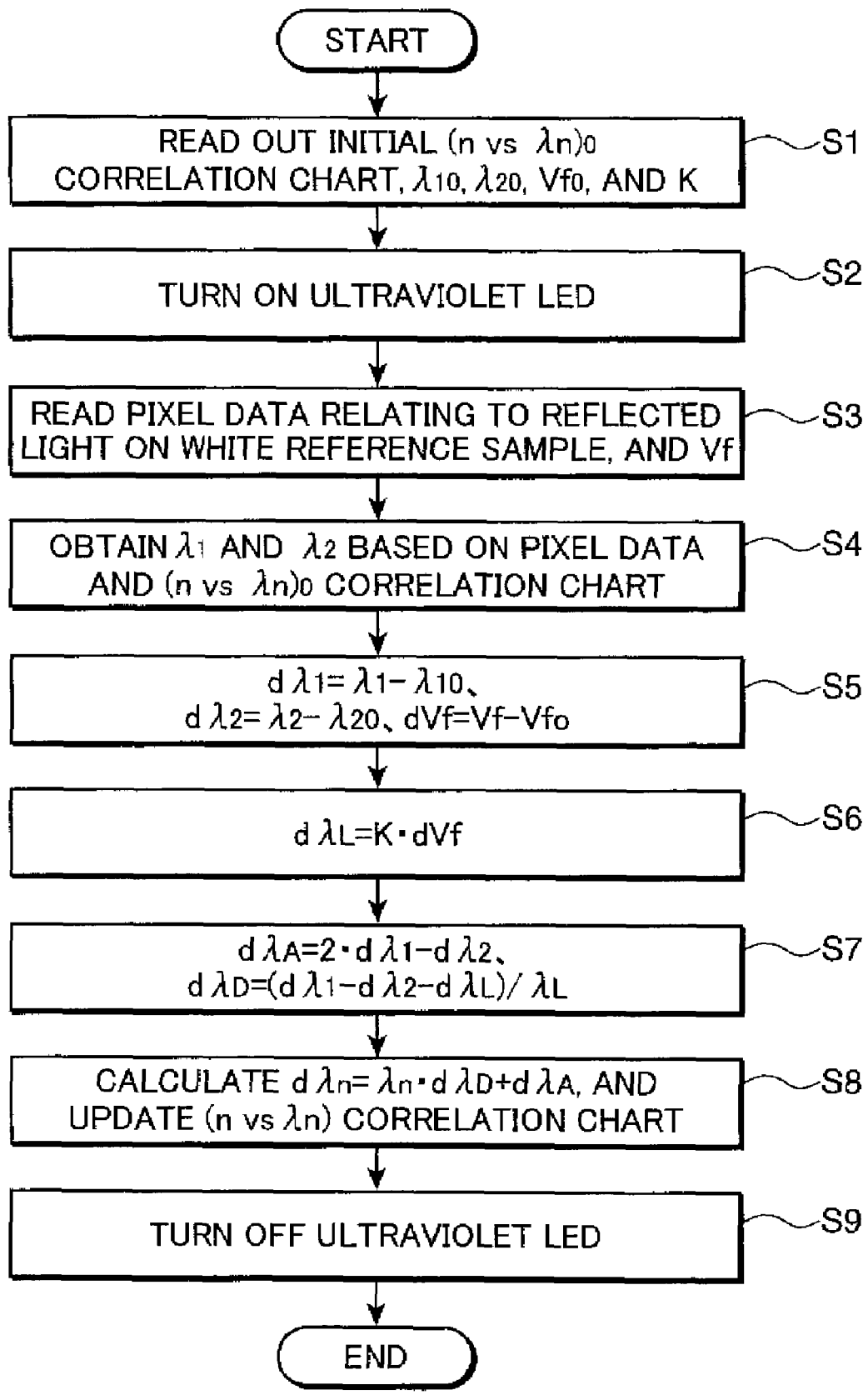
FIG. 4 is a flowchart showing an example of an operation of correcting a wavelength displacement in the embodiment.

Specifically, as shown in the correction flow of FIG. 4, first, the central processor 61 of the computation controller 6 reads out, from the storage 62, an initial (n versus λn)$_0$-correlation chart, the centroid wavelength initial values $\lambda_{10}$ and $\lambda_{20}$ of the first-order beam and the second-order beam derived from the ultraviolet light emitting diode 31, the forward voltage initial value $Vf_0$, and the value of the gradient K of the straight line for approximating the relation between the forward voltage Vf and the emission wavelength $\lambda_L$ (Step S1). Then, the central processor 61 turns on the ultraviolet light emitting diode 31 via the LED controller 32 in a state that the white reference sample 10 is placed in the measurement aperture (Step S2). Then, the central processor 61 reads a digital pixel output from the polychromator 5 obtained by measuring the monochromatic beam which has been emitted from the ultraviolet light emitting diode 31 and reflected on the white reference sample 10, and a measurement value of the forward voltage Vf of the ultraviolet light emitting diode 31 (Step S3). Then, the central processor 61 obtains the centroid wavelengths $\lambda_1$ and $\lambda_2$ of the first-order dispersed image and the second-order dispersed image obtained by emission of the ultraviolet light emitting diode 31, based on the digital pixel output and the (n versus λn)$_0$-correlation chart (Step S4) Then, the central processor 61 calculates the displacement amounts $d\lambda_1$ and $d\lambda_2$ from the centroid wavelength initial values $\lambda_{10}$ and $\lambda_{20}$, and the forward voltage displacement amount dVf by the equations (1) (2), and (6), respectively (Step S5). Then, the central processor 61 converts the forward voltage displacement dVf into the emission wavelength displacement amount $d\lambda_L$ by the equation (7) (Step S6). Then, the central processor 61 calculates the uniform wavelength displacement amount $d\lambda_A$ by the equation (5), and calculates the dispersion width displacement amount $d\lambda_D$ by the equation (8) (Step S7). Then, the central processor 61 calculates the wavelength shift amount dλn by the equation (10) by using the wavelength displacement amount $d\lambda_A$ and the dispersion width displacement amount $d\lambda_D$, and updates the current (n versus λn)-correlation chart stored in the storage 62 by correcting the (n versus λn)$_0$-correlation chart using the wavelength shift amount dλn (Step S8). Then, the central processor 61 turns off the ultraviolet light emitting diode 31 (Step S9) Thereby, the correction flow is ended.

(Measurement Flow)

Figure 5:
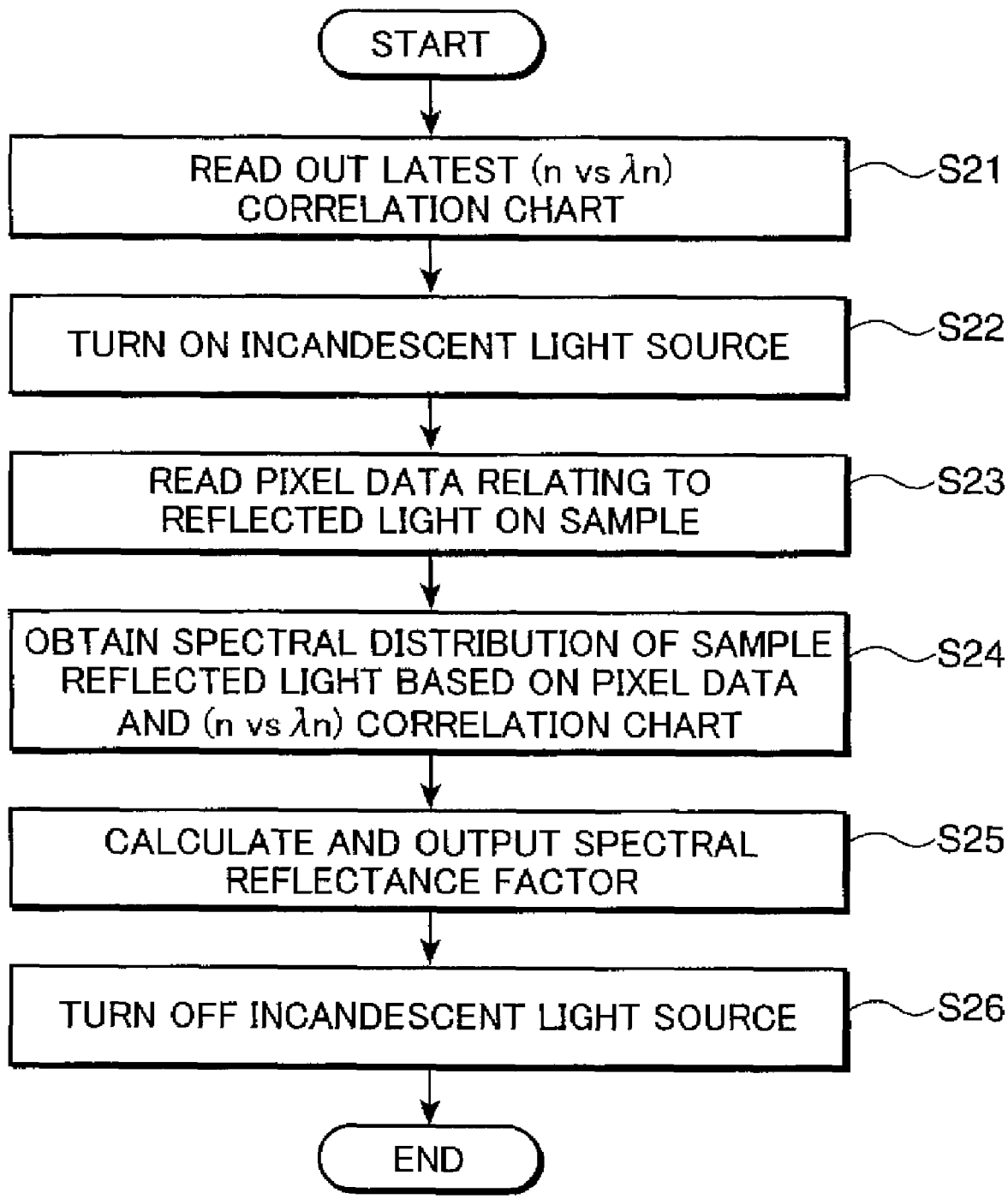
FIG. 5 is a flowchart showing an example of an operation of measuring a reflection characteristic of a sample.

At the time of measuring the sample 1, the spectral reflectance factor of the sample 1 is obtained by the measurement flow shown in FIG. 5, based on the updated (n versus λn)-correlation chart. Specifically, first, the central processor 61 in the computation controller 6 reads out a latest (n versus λn)-correlation chart from the storage 62 (Step S21). Then, the central processor 61 turns on the incandescent lamp 21 as an incandescent light source via the lamp controller 22 in a state that the sample 1 is placed in the measurement aperture (Step S22). Then, the central processor 61 reads the digital pixel output from the polychromator 5 obtained by measuring the light reflected on the sample 1 i.e. sample reflected light (Step S23). Then, the central processor 61 obtains a spectral distribution of the sample reflected light, based on the digital pixel output and the (n versus λn)-correlation chart (Step S24). Then, the central processor 61 calculates the spectral reflectance factor of the sample 1, based on the spectral distribution information obtained by measuring the sample 1 in Step S24, using the calibration coefficient derived from the spectral distribution obtained by measuring the white reference sample 10 with use of the polychromator 5 by a procedure similar to the aforementioned procedure at the time of white calibration (Step S25). Then, the central processor 61 turns off the incandescent lamp 21 (Step S26). Thereby, the measurement flow is ended.

In the embodiment, the relation between the forward voltage displacement amount dVf and the emission wavelength displacement amount $d\lambda_L$ of the ultraviolet light emitting diode 31 is approximated by the straight line having the gradient K i.e. by a linear function. Alternatively, approximation may be performed by using a higher order function. In the modification, the wavelength displacement correcting system 100 may be configured in such a manner that a relation i.e. a function between the forward voltage displacement amount dVf and the emission wavelength displacement amount $d\lambda_L$, which is approximated by a non-linear function, may be stored as conversion table information i.e. a lookup table.

In the embodiment, the forward voltage Vf to be obtained by driving the ultraviolet light emitting diode 31 with one constant current I f is used. Alternatively, forward voltages to be obtained by driving the ultraviolet light emitting diode 31 with two kinds of constant current may be used. Specifically, assuming that forward voltages to be obtained by driving the ultraviolet light emitting diode 31 with two constant currents I 1 and I 2 are $Vf_1$ and $Vf_2$, a relation between the difference $(Vf_1-Vf_2)$ of the forward voltages, and the temperature T of the ultraviolet light emitting diode 31 can be approximated by the following equation (11). On the other hand, there is defined a substantially proportional relation between the temperature T and the emission wavelength $\lambda_L$. In view of the above, assuming that the proportional constant is K', the emission wavelength displacement amount $d\lambda_L$ is obtained by the following equation (12) by using a displacement amount $d(Vf_1-Vf_2)$ of the forward voltage difference $(Vf_1-Vf_2)$. The forward voltage difference displacement amount $d(Vf_1-Vf_2)$ is obtained by subtracting $(Vf_{10}-Vf_{20})$, which is an initial value of the forward voltage difference $(Vf_1-Vf_2)$ before the displacement, from the forward voltage difference $(Vf_1-Vf_2)$.

$$Vf_1-Vf_2=(k_b/q)*T*\ln(I_1/I_2) \quad (11)$$

where the symbol "$k_b$" represents a Boltzmann constant, and the symbol "q" represents an electric charge of an electron.

$$d\lambda_L=K'*d(Vf_1-Vf_2) \quad (12)$$

The above modification enables to suppress an error resulting from divergence from the proportional relation between the temperature and the forward voltage. Specifically, whereas the displacement amount ($d\lambda_L=K*dvf$) as expressed by the equation (7) in the embodiment is defined based on a premise that the forward voltage Vf and the temperature T have an approximately linear relation, the equation (12) theoretically has a linear relation between the forward voltage difference $(Vf_1-Vf_2)$ and the temperature. Accordingly, the equation (12) provides a precise calculation result, as compared with the equation (7).

In the embodiment, the first-order beam indicated by the solid line 303 and the second-order beam indicated by the solid line 304 are used as diffracted beams i.e. dispersed light images to be obtained by driving the ultraviolet light emitting diode 31 to check i.e. compare a difference in wavelength displacement amount of the polychromator 5. Alternatively, beams of serial orders e.g. a second-order beam and a third-order beam i.e. a second-order diffracted beam and a third-order diffracted beam may be used. Further alternatively, beams of every other ordinal number e.g. a first-order beam and a third-order beam may be used, in place of the beams of serial orders. Further alternatively, diffracted beams of minus value e.g. a minus first-order diffracted beam and a minus second-order diffracted beam may be used. Further alternatively, three or more diffracted beams may be used, in place of the two diffracted beams. Further alternatively, at least two groups of diffracted beams each consisting of diffracted beams of multiple orders e.g. a first diffracted beam group consisting of first-order beams and second-order beams, and a second diffracted beam group consisting of second-order beams and third-order beams may be used. In other words, at least two kinds of diffracted beams different from each other are usable.

As described above, in the wavelength displacement correcting system 100 of the embodiment, an incident beam incident through the incident slit 51 of the polychromator 5 as a spectral device is diffracted on the diffraction grating 52 to form a dispersed light image of the aperture 51a of the incident slit 51, and information relating to the dispersed light image is outputted from the spectral device. The ultraviolet light emitting diode 31 as a light emitting diode is driven by one constant current $I_f$, or more than one constant currents $I_1$ and $I_2$. The computation controller 6 as a computation controlling device performs a predetermined computation based on the output information outputted from the spectral device, and controls driving of the light emitting diode. The computation controlling device is operative to perform the following first, second, and third computations by using at least two diffracted beam output values $\lambda_1$ and $\lambda_2$ of different orders in the dispersed light image information to be outputted from the spectral device, and one or more forward voltage values Vf, or $Vf_1$ and $Vf_2$ corresponding to the constant current(s) for driving the light emitting diode; and at least two diffracted beam output initial values $\lambda_{10}$ and $\lambda_{20}$, and one or more forward voltage initial values $Vf_0$ or $(Vf_{10}-Vf_{20})$, which are obtained when the monochromatic beam is incident from the light emitting diode onto the spectral device as an incident beam by driving the light emitting diode.

first computation: a wavelength displacement amount $d\lambda_L$ of the monochromatic beam from the light emitting diode is calculated by using one or more forward voltage values and one or more forward voltage initial values.

second computation: wavelength displacement amounts $d\lambda_1$ and $d\lambda_2$ of at least two diffracted beams are calculated by using at least two diffracted beam output values and at least two diffracted beam output initial values.

third computation: a uniform wavelength displacement amount $d\lambda_A$ and a dispersion width displacement amount $d\lambda_D$ i.e. a dispersion width displacement rate of the spectral device are calculated by using the calculated wavelength displacement amount of the monochromatic beam from the light emitting diode, and the calculated wavelength displacement amounts of at least two diffracted beams.

Then, a wavelength displacement of the spectral device is corrected based on the computation results.

The above arrangement enables to correct both the dispersion width displacement amount $d\lambda_D$ and the uniform wavelength displacement amount $d\lambda_A$, resulting from a change e.g. a relative positional displacement of the constituent elements of the spectral device with time and/or under heat, in the case where a plastic molded part is used as the diffraction grating 52 i.e. an optical component, or the housing 54 of the spectral device. This enables to correct a displacement amount $d\lambda$ of the spectral device at the wavelength $\lambda$, i.e., perform a wavelength displacement correction. In other words, this arrangement enables to substantially maintain the wavelength precision at the time of initial wavelength calibration. Since solely the ultraviolet light emitting diode 31 and the LED controller 32 as a circuit for driving the ultraviolet light emitting diode 31 including the forward voltage measuring circuit are the parts required for maintaining the wavelength precision, the advantage of using plastic molded parts for cost reduction can be secured.

The aforementioned at least two diffracted beams are a first-order diffracted beam e.g. the first-order beam indicated by the solid line 303, and a second-order diffracted beam e.g. the second-order beam indicated by the solid line 304. With this arrangement, a diffracted beam output can be securely obtained, thereby enabling to precisely correct the dispersion width change and the uniform wavelength change.

The computation controlling device calculates the uniform wavelength displacement amount $d\lambda_A$ by implementing the equation (5) in the third computation, calculates the dispersion width displacement amount $d\lambda_D$ by implementing the equation (8) in the third computation, and calculates a wavelength displacement amount $d\lambda$ at the wavelength $\lambda$ by implementing the equation (9), using the displacement amounts $d\lambda_A$ and $d\lambda_D$ obtained in the third computation. Then, correction is performed by using the wavelength displacement amount $d\lambda$. By implementing the above operation, the uniform wavelength displacement amount $d\lambda_A$ and the dispersion width displacement amount $d\lambda_D$ can be easily calculated by using the equations (5) and (8). This enables to facilitate wavelength displacement correction at the wavelength $\lambda$.

The computation controlling device calculates, in the first computation, the wavelength displacement amount $d\lambda_L$ of the monochromatic beam from the light emitting diode by implementing the equation (7) using the forward voltage displacement amount dVf, as a displacement amount of the forward voltage value Vf from the forward voltage initial value $Vf_0$, and the predetermined proportional constant K. By implementing the above operation, the wavelength displacement amount $d\lambda_L$ of the monochromatic beam from the light emitting diode can be easily calculated by a simple method using the forward voltage value Vf to be obtained by driving the light emitting diode.

The computation controlling device calculates, in the first computation, the wavelength displacement amount $d\lambda_L$ of the monochromatic beam from the light emitting diode by implementing the equation (12), using a forward voltage difference displacement amount $d(Vf_1-Vf_2)$, as a displacement amount of a difference value $(Vf_1-Vf_2)$ between two forward voltage values $Vf_1$ and $Vf_2$ from a forward voltage difference initial value $(Vf_{10}-Vf_{20})$, and the predetermined proportional constant K. By implementing the above operation, the wavelength displacement amount $d\lambda_L$ of the monochromatic beam from the light emitting diode can be precisely calculated by using the two forward voltage values $Vf_1$ and $Vf_2$ to be obtained by driving the light emitting diode.

Also, a wavelength displacement correcting method of the embodiment includes: a first step of diffracting an incident beam incident through the incident slit of the spectral device on the diffraction grating to form a dispersed light image of the incident slit, and outputting information relating to the dispersed light image; a second step of driving the light emitting diode by one or more constant currents; and a third step of performing a predetermined computation based on the dispersed light image information acquired in the first step, and controlling driving of the light emitting diode. In the third step, the following fourth, fifth, and sixth steps are executed, based on at least two diffracted beam output values $\lambda_1$ and $\lambda_2$ of different orders in the dispersed light image information, and one or more forward voltage values Vf, or $Vf_1$ and $Vf_2$ corresponding to the constant current(s) for driving the light emitting diode; and at least two diffracted beam output initial values $\lambda_{10}$ and $\lambda_{20}$, and one or more forward voltage initial values $Vf_0$, or $Vf_{10}$ and $Vf_{20}$, which are obtained when the monochromatic beam is incident from the light emitting diode onto the spectral device as an incident beam by driving the light emitting diode.

fourth step: calculating a wavelength displacement amount $d\lambda_L$ of the monochromatic beam from the light emitting diode by using one or more forward voltage values and one or more forward voltage initial values.

fifth step: calculating wavelength displacement amounts $d\lambda_1$ and $d\lambda_2$ of at least two diffracted beams by using at least two diffracted beam output values and at least two diffracted beam output initial values.

sixth step: calculating a uniform wavelength displacement amount $d\lambda_A$ and a dispersion width displacement amount $d\lambda_D$ of the spectral device by using the calculated wavelength displacement amount of the monochromatic beam from the light emitting diode, and the calculated wavelength displacement amounts of at least two diffracted beams.

The wavelength displacement correcting method of the embodiment further includes a seventh step of correcting a wavelength displacement of the spectral device, based on the computation result obtained in the fourth, the fifth, and the sixth steps.

The above arrangement enables to correct both the dispersion width displacement amount $d\lambda_D$ and the uniform wavelength displacement amount $d\lambda_A$, resulting from a change e.g. a relative positional displacement of the constituent elements of the spectral device with time and/or under heat, in the case where a plastic molded part is used as the diffraction grating 52 i.e. an optical component or the housing 54 of the spectral device. This enables to correct a displacement amount $d\lambda$ of the spectral device at the wavelength $\lambda$, i.e., perform a wavelength displacement correction. In other words, this arrangement enables to substantially maintain the wavelength precision at the time of initial wavelength calibration.

The specification discloses the aforementioned arrangements. The following is a summary of the primary arrangements of the embodiment.

A wavelength displacement correcting system according to an aspect of the invention is a wavelength displacement correcting system for correcting a wavelength displacement of a spectral device comprising: a diffraction grating for dispersing an incident beam; a light receiving section for receiving beams dispersed on the diffraction grating at each wavelength, and receiving diffracted beams of different orders; a light source for emitting the beam to be incident onto the diffraction grating, the light source including a light emitting diode to be driven by a constant current; a measuring section for measuring a forward voltage value of the light emitting diode to be obtained when the light emitting diode is driven by the constant current; and a computing section for computing a wavelength correction value based on output information from the light receiving section, and the forward voltage value of the light emitting diode, wherein the computing section is operative to, in response to incidence of the incident beam onto the diffraction grating by driving the light emitting diode of the light source, calculate a wavelength displacement amount of a monochromatic beam from the light emitting diode, based on the forward voltage value measured by the measuring section, and a forward voltage initial value, calculate displacement amounts of the diffracted beams, based on diffracted beam output values of different orders to be outputted from the light receiving section, and diffracted beam output initial values of different orders, and calculate a uniform wavelength displacement amount and a dispersion width displacement amount of the dispersed beams of the spectral device, based on the calculated wavelength displacement amount of the monochromatic beam, and the calculated wavelength displacement amounts of two diffracted beams of different orders.

In the above arrangement, the wavelength precision at the initial wavelength calibration is substantially maintained. In particular, even if a plastic molded part whose property with time and/or under heat is unstable is used as the constituent elements of the spectral device including a diffraction grating, the wavelength precision can be stably and substantially maintained. Accordingly, the arrangement is particularly suitable for a spectral device, wherein a plastic molded part is used as a diffraction grating and/or a housing.

Preferably, in the above arrangement, the light source and the measuring section may be integrally fixed in the spectral device.

In the above arrangement, the light source and the measuring section are integrally fixed in the spectral device. Accordingly, as compared with an arrangement that a light source is externally provided, the wavelength displacement correction can be performed with ease and high precision without a cumbersome operation, because there is no need of positioning the light source relative to the measuring section, connecting a signal line, or performing a like operation.

Preferably in the above arrangement, the diffracted beams of different orders may be a first-order diffracted beam and a second-order diffracted beam.

In the above arrangement, since the diffracted beams of different orders are the first-order diffracted beam and the second-order diffracted beam, the diffracted beam output can be securely obtained. Thereby, the dispersion width change and the uniform wavelength change can be corrected precisely.

Preferably, in the above arrangement, assuming that the wavelength displacement amount of the monochromatic beam to be calculated is $d\lambda_L$, and the wavelength displacement amounts of the first-order diffracted beam and the second-order diffracted beam to be calculated are $d\lambda_1$ and $d\lambda_2$, respectively, the computing section may be operative to calculate the uniform wavelength displacement amount $d\lambda_A$ by the equation (1), calculate the dispersion width displacement amount $d\lambda_D$ by the equation (2), and calculate the wavelength displacement amount $d\lambda$ at the wavelength by the equation (3) by using the calculated uniform wavelength displacement amount $d\lambda_A$ and the calculated dispersion width displacement amount $d\lambda_D$ to correct the wavelength displacement of the spectral device:

$$d\lambda_A = 2 \cdot d\lambda_1 - d\lambda_2 \tag{1}$$

$$d\lambda_D = (d\lambda_2 - d\lambda_1 - d\lambda_L)/\lambda_L \tag{2}$$

$$d\lambda = \lambda \cdot d\lambda_D + d\lambda_A \tag{3}$$

where the symbol "*" represents multiplication, and the symbol "/" represents division.

In the above arrangement, the computing section is operative to calculate the uniform wavelength displacement amount $d\lambda_A$ by the equation (1), calculate the dispersion width displacement amount $d\lambda_D$ by the equation (2), and calculate the wavelength displacement amount $d\lambda$ at the wavelength $\lambda$ by the equation (3) by using the calculated uniform wavelength displacement amount $d\lambda_A$ and the calculated dispersion width displacement amount $d\lambda_D$ to correct the wavelength displacement of the spectral device. This enables to easily calculate the uniform wavelength displacement amount $d\lambda_A$ and the dispersion width displacement amount $d\lambda_D$ by using the equations (1) and (2), thereby enabling to easily correct the wavelength displacement at the wavelength $\lambda$.

Preferably, in the above arrangement, the computing section may be operative to calculate the wavelength displacement amount $d\lambda_L$ of the monochromatic beam to be calculated by the equation (4) by using a forward voltage displacement amount dVf, as a displacement amount of the forward voltage value Vf from the forward voltage initial value $Vf_0$, and a predetermined proportional constant K:

$$d\lambda_L = K \cdot dVf \tag{4}$$

In the above arrangement, the computing section is operative to calculate the wavelength displacement amount $d\lambda_L$ of the monochromatic beam by the equation (4) by using the forward voltage displacement amount dVf and the predetermined proportional constant K. This enables to easily calculate the wavelength displacement amount $d\lambda_L$ of the monochromatic beam by a simple method using the forward voltage value Vf to be obtained by driving the light emitting diode.

Preferably, in the above arrangement, the computing section may be operative to calculate the wavelength displacement amount $d\lambda_L$ of the monochromatic beam to be calculated by the equation (5) by using a forward voltage difference displacement amount $d(Vf_1-Vf_2)$, as a displacement amount of a difference value $(Vf_1-Vf_2)$ between two forward voltage values $Vf_1$ and $Vf_2$ of the light emitting diode driven by two different constant currents from a forward voltage difference initial value $(Vf_{10}-Vf_{20})$, and a predetermined proportional constant K':

$$d\lambda_L = K' \cdot d(Vf_1 - Vf_2) \tag{5}$$

In the above arrangement, the computing section is operative to calculate the wavelength displacement amount $d\lambda_L$ of the monochromatic beam by the equation (5) by using the forward voltage difference displacement amount $d(Vf_1-Vf_2)$ and the predetermined proportional constant K'. This enables to easily calculate the wavelength displacement amount $d\lambda_L$ of the monochromatic beam by using the two forward voltage values $Vf_1$ and $Vf_2$ to be obtained by driving the light emitting diode.

A wavelength displacement correcting system according to another aspect of the invention is a wavelength displacement correcting system for correcting a wavelength displacement of a spectral device comprising: a diffraction grating for dispersing an incident beam; a light receiving section for receiving beams dispersed by the diffraction grating at each wavelength, and receiving diffracted beams of different orders; a light source for emitting the beam to be incident onto the diffraction grating, the light source including a light emitting diode to be driven by a constant current; a measuring section for measuring a forward voltage value of the light emitting diode to be obtained when the light emitting diode is driven by the constant current; and a computing section for computing a wavelength correction value based on output information from the light receiving section, and the forward voltage value of the light emitting diode, wherein the computing section is operative to, in response to incidence of the incident beam onto the diffraction grating by driving the light emitting diode of the light source, calculate a wavelength displacement amount of a monochromatic beam from the light emitting diode, based on the forward voltage value measured by the measuring section, and a forward voltage initial value, calculate displacement amounts of the diffracted beams, based on diffracted beam output values of different orders to be outputted from the light receiving section, and diffracted beam output initial values of different orders, and calculate a dispersion width displacement amount of the dispersed beams of the spectral device, based on the calculated wavelength displacement amount of the monochromatic beam, and the calculated wavelength displacement amounts of two diffracted beams of different orders.

In the above arrangement, the wavelength precision at the initial wavelength calibration is substantially maintained. In particular, even if a plastic molded part whose property with time and/or under heat is unstable is used as the constituent elements of the spectral device including a diffraction grating, the wavelength precision can be stably and substantially maintained. Accordingly, the arrangement is particularly suitable for a spectral device, wherein a plastic molded part is used as a diffraction grating and/or a housing.

A wavelength displacement correcting system according to yet another aspect of the invention is a wavelength displacement correcting system comprising: a spectral device for forming a dispersed light image of an incident slit by diffracting an incident beam incident through the incident slit on a diffraction grating, and outputting information relating to the dispersed light image; a light emitting diode to be driven by one or more constant currents; and a computation controlling device for performing a predetermined computation based on output information to be outputted from the spectral device, and controlling driving of the light emitting diode, wherein the computation controlling device performs the following first, second, and third computations by using at least two diffracted beam output values of different orders in the dispersed light image information to be outputted from the spectral device, and one or more forward voltage values corresponding to the constant current(s) for driving the light emitting diode; and at least two diffracted beam output initial values, and one or more forward voltage initial values, which are obtained when the monochromatic beam is incident from the light emitting diode onto the spectral device as an incident beam by driving the light emitting diode. Then, a wavelength displacement of the spectral device is corrected based on the computation results.

first computation: a wavelength displacement amount of the monochromatic beam from the light emitting diode is calculated by using one or more forward voltage values and one or more forward voltage initial values.

second computation: wavelength displacement amounts of at least two diffracted beams are calculated by using at least two diffracted beam output values and at least two diffracted beam output initial values.

third computation: a uniform wavelength displacement amount and a dispersion width displacement amount of the spectral device are calculated by using the calculated wavelength displacement amount of the monochromatic beam from the light emitting diode, and the calculated wavelength displacement amounts of at least two diffracted beams.

A wavelength displacement correcting method according to still another aspect of the invention is a wavelength displacement correcting method comprising: a first step of forming a dispersed light image of an incident slit by diffracting an incident beam incident through the incident slit on a diffraction grating, and acquiring information relating to the dispersed light image; a second step of driving a light emitting diode by one or more constant currents; and a third step of performing a predetermined computation based on the dispersed light image information acquired in the first step, and controlling driving of the light emitting diode, wherein the third step includes the following fourth, fifth, and sixth steps using at least two diffracted beam output values of different orders in the dispersed light image information, and one or more forward voltage values corresponding to the constant current(s) for driving the light emitting diode; and at least two diffracted beam output initial values, and one or more forward voltage initial values, which are obtained when the monochromatic beam is incident onto the spectral device as an incident beam by driving the light emitting diode. The wavelength displacement correcting method further includes a seventh step of correcting a wavelength displacement of the spectral device based on the computation results obtained in the fourth, the fifth, and the sixth steps.

fourth step: calculating a wavelength displacement amount of the monochromatic beam from the light emitting diode by using one or more forward voltage values and one or more forward voltage initial values.

fifth step: calculating wavelength displacement amounts of at least two diffracted beams by using at least two diffracted beam output values and at least two diffracted beam output initial values sixth step: calculating a uniform wavelength displacement amount and a dispersion width displacement amount of the spectral device by using the calculated wavelength displacement amount of the monochromatic beam from the light emitting diode, and the calculated wavelength displacement amounts of at least two diffracted beams.

In the above arrangements, the incident beam incident through the incident slit is diffracted on the diffraction grating to form the dispersed light image of the incident slit, and the information relating to the dispersed light image is outputted from the spectral device. The light emitting diode of the light source is driven by one or more constant currents. Then, the predetermined computation is performed based on the dispersed light image information, and driving of the light emitting diode is controlled. The first, the second, and the third computations (or the fourth, the fifth, and the sixth steps) are performed, based on at least two diffracted beam output values of different orders in the dispersed light image information, and one or more forward voltage values corresponding to the constant current(s) for driving the light emitting diode; and at least two diffracted beam output initial values, and one or more forward voltage initial values, which are obtained when the monochromatic beam is incident from the light emitting diode onto the spectral device as an incident beam by driving the light emitting diode. Then, the wavelength displacement of the spectral device is corrected based on the computation results.

In the above arrangements, both the dispersion width change and the uniform wavelength change, resulting from a change e.g. a relative positional displacement of the constituent elements of the spectral device with time and/or under heat can be corrected. This enables to correct the wavelength displacement of the spectral device at each wavelength. According to the above arrangements, the wavelength precision at the initial wavelength calibration is substantially maintained. In particular, even if a plastic molded part whose property with time and/or under heat is unstable is used as the constituent elements of the spectral device including a diffraction grating, the wavelength precision can be stably and substantially maintained. Accordingly, the arrangement is particularly suitable for a spectral device, wherein a plastic molded part is used as a diffraction grating and/or a housing.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A wavelength displacement correcting system for correcting a wavelength displacement of a spectral device, comprising:
   a diffraction grating for dispersing an incident beam;
   a light receiving section for receiving beams dispersed on the diffraction grating at each wavelength, and receiving diffracted beams of different orders;
   a light source for emitting the beam to be incident onto the diffraction grating, the light source including a light emitting diode to be driven by a constant current;
   a measuring section for measuring a forward voltage value of the light emitting diode to be obtained when the light emitting diode is driven by the constant current; and
   a computing section for computing a wavelength correction value based on output information from the light receiving section, and the forward voltage value of the light emitting diode, wherein
   the computing section is operative to, in response to incidence of the incident beam onto the diffraction grating by driving the light emitting diode of the light source,
   calculate a wavelength displacement amount of a monochromatic beam from the light emitting diode, based on the forward voltage value measured by the measuring section, and a forward voltage initial value,
   calculate displacement amounts of the diffracted beams, based on diffracted beam output values of different orders to be outputted from the light receiving section, and diffracted beam output initial values of different orders, and
   calculate a uniform wavelength displacement amount and a dispersion width displacement amount of the dispersed beams of the spectral device, based on the calculated wavelength displacement amount of the monochromatic beam, and the calculated wavelength displacement amounts of two diffracted beams of different orders.

2. The wavelength displacement correcting system according to claim 1, wherein
   the light source and the measuring section are integrally fixed in the spectral device.

3. The wavelength displacement correcting system according to claim 1, wherein
   the diffracted beams of different orders are a first-order diffracted beam and a second-order diffracted beam.

4. The wavelength displacement correcting system according to claim 3, wherein
   for a wavelength displacement amount of the monochromatic beam to be calculated $d\lambda_L$, and wavelength displacement amounts of the first-order diffracted beam and the second-order diffracted beam to be calculated $d\lambda_1$ and $d\lambda_2$, respectively,
   the computing section is operative to calculate the uniform wavelength displacement amount $d\lambda_A$ by the equation (1), calculate the dispersion width displacement amount $d\lambda_D$ by the equation (2), and calculate the wavelength displacement amount $d\lambda$ at the wavelength $\lambda$ by the equation (3) by using the calculated uniform wavelength displacement amount $d\lambda_A$ and the calculated dispersion width displacement amount $d\lambda_D$ to correct the wavelength displacement of the spectral device:

$$d\lambda_A = 2 * d\lambda_1 - d\lambda_2 \quad (1)$$

$$d\lambda_D = (d\lambda_2 - d\lambda_1 - d\lambda_L)/\lambda_L \quad (2)$$

$$d\lambda = \lambda * d\lambda_D = d\lambda_A \quad (3)$$

where the symbol "*" represents multiplication, and the symbol "/" represents division.

5. The wavelength displacement correcting system according to claim 4, wherein
   the computing section is operative to calculate the wavelength displacement amount $D\lambda_L$ of the monochromatic beam to be calculated by the equation (4) by using a forward voltage displacement amount dVf, as a displacement amount of the forward voltage value Vf from the forward voltage initial value $Vf_0$, and a predetermined proportional constant K:

$$d\lambda_L = K * dVf \quad (4).$$

6. The wavelength displacement correcting system according to claim 4, wherein
   the computing section is operative to calculate the wavelength displacement amount $D\lambda_L$ of the monochromatic beam to be calculated by the equation (5) by using a forward voltage difference displacement amount $d(Vf_1 - Vf_2)$, as a displacement amount of a difference value $(Vf_1 - Vf_2)$ between two forward voltage values $Vf_1$ and $Vf_2$ of the light emitting diode driven by two different constant currents from a forward voltage difference initial value $(Vf_{10} - Vf_{20})$, and a predetermined proportional constant K':

$$d\lambda_L = K' * d(Vf_1 - Vf_2) \quad (5).$$

7. A wavelength displacement correcting system for correcting a wavelength displacement of a spectral device, comprising:
   a diffraction grating for dispersing an incident beam;
   a light receiving section for receiving beams dispersed on the diffraction grating at each wavelength, and receiving diffracted beams of different orders;
   a light source for emitting the beam to be incident onto the diffraction grating, the light source including a light emitting diode to be driven by a constant current;
   a measuring section for measuring a forward voltage value of the light emitting diode to be obtained when the light emitting diode is driven by the constant current; and
   a computing section for computing a wavelength correction value based on output information from the light receiving section, and the forward voltage value of the light emitting diode, wherein
   the computing section is operative to, in response to incidence of the incident beam onto the diffraction grating by driving the light emitting diode of the light source,
   calculate a wavelength displacement amount of a monochromatic beam from the light emitting diode, based on the forward voltage value measured by the measuring section, and a forward voltage initial value, calculate displacement amounts of the diffracted beams, based on diffracted beam output values of different orders to be outputted from the light receiving section, and diffracted beam output initial values of different orders, and calculate a dispersion width displacement amount of the dispersed beams of the spectral device, based on the calculated wavelength displacement amount of the monochromatic beam, and the calculated wavelength displacement amounts of two diffracted beams of different orders.

* * * * *